C. E. RODGERS.
JACK BLOCK AND CAR WHEEL CLAMP.
APPLICATION FILED AUG. 25, 1920.
1,391,979.
Patented Sept. 27, 1921.
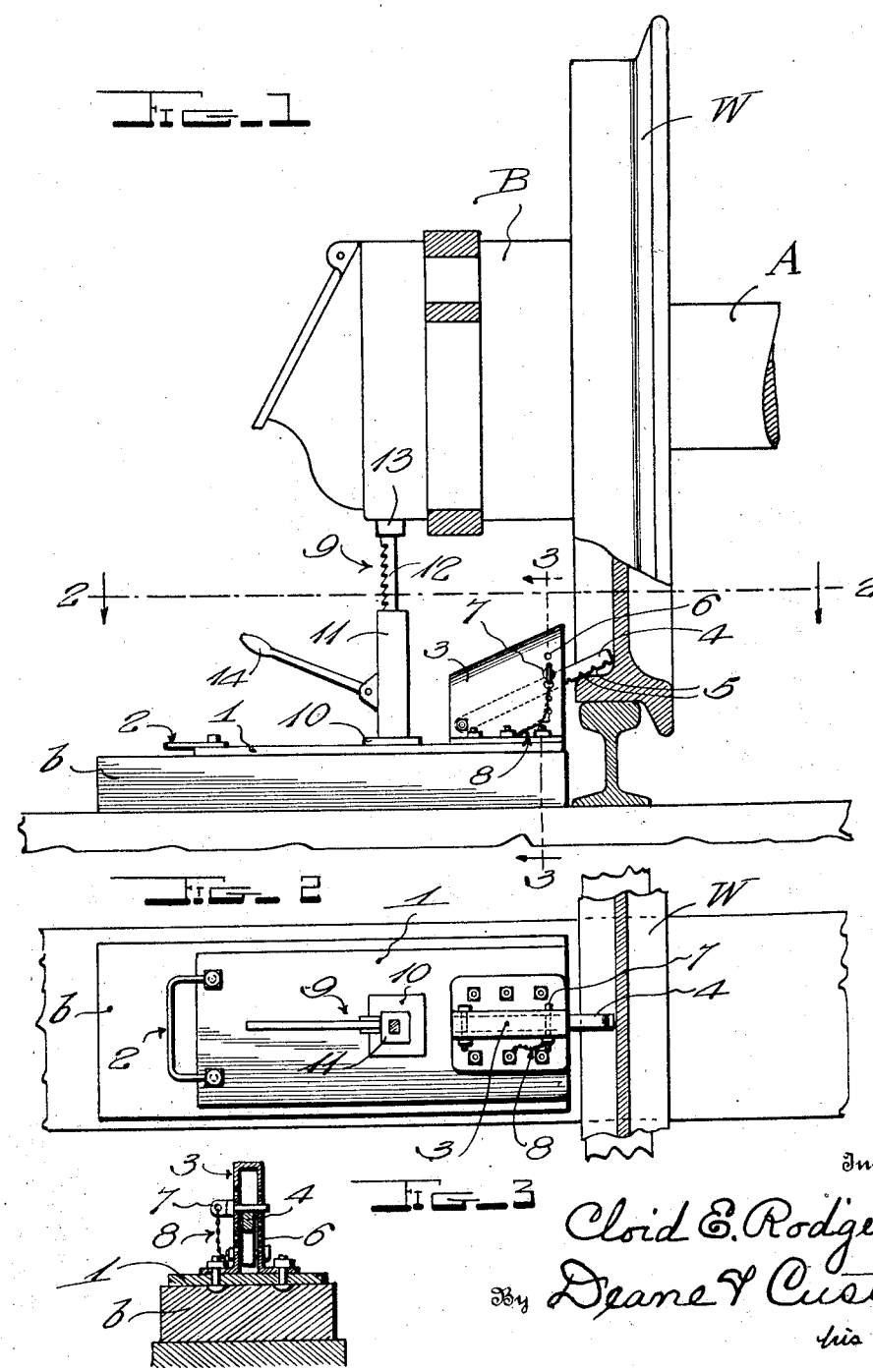

UNITED STATES PATENT OFFICE.

CLOID E. RODGERS, OF LOGANSPORT, INDIANA.

JACK-BLOCK AND CAR-WHEEL CLAMP.

1,391,979.     Specification of Letters Patent.     Patented Sept. 27, 1921.

Application filed August 25, 1920. Serial No. 405,987.

*To all whom it may concern:*

Be it known that I, CLOID E. RODGERS, a citizen of the United States, residing at Logansport, in the county of Cass and State of Indiana, have invented certain new and useful Improvements in Jack-Blocks and Car-Wheel Clamps, of which the following is a specification, reference being had therein to the accompanying drawing.

My invention relates to improvements in rim engaging devices, jack blocks and car wheel clamps for holding the wheel of a car while jacking up the journal or axle box to remove, renew or replace the journal bearings or brasses.

My invention has for its object a device whereby the bearing members or brasses may be replaced in a few minutes while the cars are on the right of way. Under the old method of replacing a brass the wheel and axle were held against movement by blocking and then the bearing was relieved of the weight of the car by blocking and jacking between the ground and the car body. This was the usual method in vogue before a car was in condition to have the bearing replaced. By such practice not only considerable time was required, but the workmen were subjected to continual danger by being beneath the car when blocking it up, besides the additional danger of the blocking giving way during the operation of replacing the bearing.

To obviate said difficulties I have evolved a simple form of wheel clamp that virtually eliminates blocking. Said clamp has a bearing portion and a wheel engaging portion adjustable with respect to the bearing portion so that the bearing portion may be disposed in a substantially horizontal plane substantially parallel to the axle of the car for receiving a lifting means, and the wheel engaging portion positioned to engage the flange or ball of wheels of different types. When so positioned the lifting means, such as a jack, is placed upon the bearing portion and its head brought up into position beneath the journal box or truck frame and the weight of the car acting downwardly through the jack bears upon the bearing portion and thus exerts a force upon the clamp to maintain the wheel against movement on the rail and more particularly from raising from the track when the body of the car is raised. When the bearing has been relieved of the weight of the car it may be readily replaced.

The invention is further designed to provide a wheel clamp which is disposed at the side of the railway car whereby it is not necessary to go beneath the car in using the device and the liability for accident thus avoided.

The invention is further designed to provide a new and improved form of wheel clamp which when used with a lifting device provides an efficient means for lifting a vehicle body or member carried by the vehicle from its wheels and axle or its frame.

The invention is further designed to provide a new and improved form of wheel clamp.

In the accompanying drawings:

Figure 1 is a side elevation showing the device in operation.

Fig. 2 is a horizontal sectional view taken substantially on line 2—2 of Fig. 1.

Fig. 3 is a detail vertical section on line 3—3 of Fig. 1, looking in the direction of the arrows.

The same reference characters denote like parts in each of the several figures of the drawing.

In carrying out my invention, I provide the base-plate 1, which is rectangular in form, and which may be made of any suitable material, but preferably of metal. Said base-plate 1 provides a substantial bearing area over which the force of the load may be distributed and is of a width which enables it to be used between two ties if desired. A handle 2 is detachably secured to the base-plae 1 adjacent one end thereof. An inverted U-shaped housing 3, having its top inclined rearwardly is detachably secured adjacent the other end of said base-plate 1. At the inner end of said housing 3 is detachably secured a bar 4, which is pivotally mounted within said housing 3, and projects outwardly therefrom with notches 5 in the under surface adjacent the outer end thereof for engagement with car wheel rims and the like. Near the outer end of the housing 3, and on both sides thereof, is provided a plurality of apertures 6 in vertical alinement which are disposed in pairs in horizontal alinement for the insertion of a locking pin 7, through the medium of which various adjustments to the bar 4 is obtained. Thus the pin 7 serves to maintain the bar 4 against movement with respect to the housing 3 and base-plate 1 in various positions of adjustment. A flexible connection, such as a chain 8, is secured to the pin 7, and to one of the securing means of the housing 3; said securing means being of the ordinary bolt and nut construction.

The means for lifting the weight of the car from the axle A, is a lifting jack 9, which comprises a base 10, and a tubular body 11, for receiving a rack bar 12, having a head 13. A lever 14 which coacts with the rack bar 12 is provided to raise or lower the latter. Said jack 9 simply rests on the base-plate 1, so that it may be moved to various positions upon the base-plate 1 to accommodate different constructions of cars as the truck frame and axle of different types of cars extend outwardly at different distances from the wheels. However, with the present construction, the usual lifting jack provided by the railroads may be used.

With the construction above described when it is desired to replace a brass in an axle box B, all that is necessary is to place the wheel clamp device in position adjacent the side of the car wheel W, and so that its supporting portion is in a substantially horizontal plane. Then the bar 4 is moved up into engagement with the ball of the wheel W and locked in this position. The lifting jack 9 is then placed at the desired position upon the base-plate 1, and the rack bar 12 elevated to bring the head 13 thereof up into engagement with a portion of the axle box B mounted on the axle A, and on further elevation of the rack bar 12 the axle box B is raised so as to relieve the wheel W and its axle A of the weight of the car, after which the cover of the axle box B is lifted up or removed and the brass resting on the upper side of the axle may be replaced without any fear of injury to the operator.

With the construction above described the brass may be replaced on a car within the station or out on the right of way and the mechanism is so simple that it may be operated by unskilled labor and the old method of blocking is practically eliminated. Moreover, owing to the arrangement of the parts the device may be sufficiently light as to be carried around by one man.

Furthermore by having all the parts of the device detachable, a great saving in expense is insured, since it will only be necessary to replace the part that has become damaged or broken without sustaining the loss of replacing the device as a whole.

It will also be noted that the base-plate 1 can rest on a wooden block $b$, as illustrated, to bring it to the required elevation with relation to the car wheel, or it can be provided with standards or legs, integral or otherwise, as deemed expedient.

It will be seen that the device is exceedingly simple and inexpensive in construction, that it is adapted to be readily employed with an ordinary lifting jack, and that it is capable of firmly gripping and holding a wheel while the car is being jacked up for removing the journal bearing or brass. Furthermore, it will be clear that the device is adjustable to engage all kinds and sizes of railroad car wheels having various rims or treads.

Various slight changes might be resorted to in the general form and arrangement of the several parts described without departing from the spirit and scope of my invention, and hence I would have it understood that I do not limit myself to the precise details set forth, but consider myself at liberty to make such slight changes and alterations as fairly fall within the spirit and scope of my invention.

Having fully described my invention, what I claim as new and desire to secure by Letters Patent, is—

1. A wheel clamp comprising a base plate adapted to support a lifting jack, an inverted U-shaped housing detachably connected to said plate and provided with pairs of alined apertures, a clamp bar having one of its ends pivotally mounted within the housing and provided at its other ends with means to grip a wheel ball, and a pin adapted to be inserted into said apertures for bridging the interior of the housing and limiting the swinging movement of the bar upwardly.

2. A wheel clamp of the kind defined by claim 1 in which the housing is provided with oppositely extending base flanges which are detachably secured to the base plate, and in which the bar is detachably connected to the housing.

In testimony whereof I hereunto affix my signature in the presence of two witnesses.

CLOID E. RODGERS. [L. S.]

Witnesses:
H. N. CALDWELL,
J. M. MCKINSEY.